(12) United States Patent
Lima et al.

(10) Patent No.: US 7,524,795 B1
(45) Date of Patent: Apr. 28, 2009

(54) ACTIVATED CARBONS FROM ANIMAL MANURE

(75) Inventors: Isabel M. Lima, Mandeville, LA (US); Wayne E. Marshall, Slidell, LA (US)

(73) Assignee: The United States of America as represented by the Secretary of the Agriculture, Washington, DC (US)

( * ) Notice: Subject to any disclaimer, the term of this patent is extended or adjusted under 35 U.S.C. 154(b) by 787 days.

(21) Appl. No.: 10/784,049

(22) Filed: Feb. 20, 2004

(51) Int. Cl.
*C01B 31/10* (2006.01)
(52) U.S. Cl. ...................... 502/432; 502/437
(58) Field of Classification Search ................. 502/432, 502/437
See application file for complete search history.

(56) References Cited

U.S. PATENT DOCUMENTS

| 3,887,461 | A |   | 6/1975  | Nickerson et al. |         |
|-----------|---|---|---------|------------------|---------|
| 5,338,462 | A |   | 8/1994  | Abe et al.       |         |
| 5,391,534 | A | * | 2/1995  | Carugati et al.  | 502/425 |
| 5,538,929 | A |   | 7/1996  | Sudhakar et al.  |         |
| 5,695,554 | A | * | 12/1997 | Landis           | 106/38.2 |
| 6,277,780 | B1|   | 8/2001  | Beckler et al.   |         |

OTHER PUBLICATIONS

Shinogi, Yoshiyuki et al., "Pyrolysis of plant, animal and human waste:physical and chemical characterizaiton of the pyrolytic products", BioresourceTechnology, 90, 2003, 241-247.

Bilitewski, Bernd, Thome-Kozimiensky (Ed), "Production & Possible Applications of Activated Carbon From Waste",Recycling Berlin '79 International Congress,Berlin XI,714-721,1979.

Bagreev, Andrey et al., "Sewage Sludge-Derived Materials as Efficient Adsorbents for Removal of Hydrogen Sulfide", Environmental Science & Technology,35,No. 7, 2001, 1537-1543.

Shinogi, Y, et al., "Basic Characteristics of Low-Temperature Carbon Products From Waste Sludge", Advances in Environmental Research, 7, 2003, pp. 661-665.

Chen, Xiaoge, et al., "Physical and Chemical Properties Study of the Activated Carbon Made From Sewage Sludge", Waste Management, 22, 2002, pp. 755-760.

Chiang, P.C., et al., "Use of Sewage Sludge for Manufacturing Adsorbents" The Canadian Journal of Chemical Engineering, vol. 65, Dec. 1987, pp. 922-927.

Tay, J. H. et al.,"A Comparative Study of Anaerobically Digested and Undigested Sewage Sludges in Preparation of Activated Carbons", Chemosphere,44,Iss Jul. 1, 2001,53-57, retrieved online [http://www.sciencedirect.com/science?_ob=ArticleURL&_udi=B6V74-435CF43-8&_user=4250348&_c...].

* cited by examiner

*Primary Examiner*—Stuart Hendrickson
(74) *Attorney, Agent, or Firm*—Randall E. Deck; John Fado; Lesley Shaw

(57) ABSTRACT

Activated carbons may be produced by carbonization of poultry manure, followed by activation of carbonized manure. Carbons produced from poultry manure by the method described herein exhibit enhanced activity for metal ion adsorption.

13 Claims, No Drawings

ACTIVATED CARBONS FROM ANIMAL MANURE

BACKGROUND OF THE INVENTION

1. Field of the Invention

The present invention relates to the development and use of activated carbons made from poultry manure that possess excellent adsorption properties, particularly with respect to the uptake of metal ions.

2. Description of the Prior Art

Activated carbons are high porosity, high surface area materials used in industry for purification and chemical recovery operations as well as environmental remediation. Toxic metals contamination of various water sources is a significant problem in many parts of the United States. Activated carbons, which can be produced from a number of precursor materials including coal, wood and agricultural plant wastes, continue to be examined for remediation of this problem. Carbon production is an expanding industry in the United States, with a present production rate of over 400 million pounds a year and a growth rate of over 3% annually.

The production of carbon, in the form of charcoal, is an age-old art. Carbon, when produced by non-oxidative carbonization or pyrolysis, is a relatively inactive material possessing a surface area limited to several square meters per gram. In order to enhance its activity, a number of protocols have been developed. These include chemical treatment of the carbonaceous material with various salts or acids prior to pyrolysis, or a reaction of the already pyrolyzed product with high temperature steam. Activated carbon is able to preferentially adsorb organic compounds and non-polar materials from either liquid or gaseous media. This property has been attributed to its possession of a form which conveys the desirable physical properties of high porosity and large surface area.

Activated carbon traditionally has been made by pyrolysis and activation of plant feedstock, from decomposed plant material such as coal to fresh plant material such as coconut shells and wood. Plant feedstock has a relatively high elemental carbon content, especially decomposed plant material, and elemental carbon yields derived from plant feedstock are considered acceptable in the carbon industry. Very few studies have evaluated animal waste as a carbon source. Animal waste generally has lower elemental carbon content and may produce lower yields than plant material when both sources are pyrolyzed and activated under the same time and temperature conditions. Activated carbon derived from plant by-products has recently been shown to adsorb metal ions in comparable quantity to some cation exchange resins sold commercially. This desirable property is the result of conferring high negative surface charge on the carbon by chemisorption of oxygen at high activation temperatures. In addition to the high surface charge and metal ion adsorption, these carbons are also capable of adsorbing organic compounds and other non-polar molecules due to the creation of typical non-polar surfaces within the carbon pore structure.

Bilitewski, in a paper entitled "Production and Possible Applications of Activated Carbon from Waste" (*Recycling Berlin, '79 Int. Recycling Cong.* Thome-Koziemiensky, Ed, Berlin V1, 1979, 714-721) produced carbon from poultry droppings by steam activation in a fluidized bed reactor. He reported that poultry droppings produced a carbon with a surface area of 60.5 $m^2/g$, elemental carbon content of 27.5% and an ash content of 52.4%. The author concluded that poultry droppings will yield only a very low grade carbon mainly due to its low surface area and high ash content.

Shinogi et al., in their paper entitled "Basic Characteristics of Low-Temperature Carbon Products from Waste Sludge" (*Adv. Environ. Res.*, 2003, 7, 661-665) prepared a pyrolysis product of cattle manure by heating to 380° C. in an atmosphere of limited air and reported the properties of the product. The pyrolysis product had a very low surface area of 2.2 $m^2/g$, an ash content of 25.6% and an elemental carbon content of 49.2%. The authors described the main use for the pyrolysis product as a soil amender due to the high phosphate ion, organic nitrate and potassium ion content. In a second paper entitled "Pyrolysis of Plant, Animal and Human Waste: Physical and Chemical Characterization of the Pyrolytic Products" (*Biosresource Technol.* 2003, 90, 241-247), Shinogi et al. also described the production of pyrolyzed cattle manure over the temperature range of 250-800° C. in closed containers. Surface areas were low (<20 $m^2/g$) over this temperature range. The pyrolyzed cattle manure also had high ash content (up to 60%), a high pH (>10) and a total carbon content of less than 40%.

Chen et al., in an article entitled "Physical and Chemical Properties Study of the Activated Carbon made from Sewage Sludge" (*Waste Management*, 2002, 22, 755-760) used zinc chloride to chemically activate sewage sludge and evaluated select physical and chemical properties of the resultant activated carbon. The carbon had a surface area of 647 $m^2/g$ and was 38.9% elemental carbon. Additionally, the carbon had 5.18 meq/g oxygen-containing surface functional groups and possessed adsorption toward phenol and carbon tetrachloride.

Martin et al., in a publication entitled "Feasibility of Activated Carbon Production from Biological Sludge by Chemical Activation with $ZnCl_2$ and $H_2SO_4$" (*Environ. Technol.*, 1996, 17, 667-672) employed either zinc chloride or sulfuric acid to produce activated carbons from surplus biological sludge obtained from a wastewater treatment plant. Under optimal activation conditions, which was achieved with sulfuric acid, the activated carbon had a surface area of 257 $m^2/g$, an ash content of 38% and a yield of 34%. Removal of phenol using the optimally produced carbon was determined and found to be about 20% of the phenol removal capability of a commercial activated carbon.

Tay et al., in a publication entitled "A Comparative Study of Anaerobically Digested and Undigested Sewage Sludges in Preparation of Activated Carbons" (*Chemosphere*, 2001, 44, 53-57) reported on the zinc chloride activation of both digested and undigested sewage sludges. The results indicated that the undigested sludge had a higher carbon content and lower ash content and, accordingly, yielded a better activated carbon with a higher surface area, pore volume, carbon content and phenol adsorption capacity than its digested counterpart.

While various methodologies exist for the creation of activated carbons from plant or plant-derived material that are effective in the adsorption of metal ions, there remains a need to create activated carbons from alternate sources of carbonaceous material that are in great abundance and that have enhanced adsorption properties toward metal ions. We describe a method and product that provides activated carbons from poultry manure with excellent metal ion adsorptive properties.

SUMMARY OF THE INVENTION

We have now developed a novel process for the creation of activated carbons from poultry manure which possess enhanced activity for the adsorption of metal ions. The activated carbons of this invention are produced by carbonization (also known as pyrolysis) of the manure, followed by activation of carbonized manure. Carbons produced from poultry manure by the method described herein possess a high active surface area, at least 200 m²/g, a high phosphorous content, at least about 4.0% by weight, and exhibit metal ion adsorption that exceeds that of commercial carbons.

In accordance with this discovery, it is an object of the invention to provide a novel method for the creation of activated carbons from poultry manure.

Another object of the invention is to provide activated carbons from poultry manure with significant metal ion adsorbing capabilities.

A further object of this invention is to provide an economical process for the utilization of poultry manure.

Yet another object of the invention is to provide a value added product which may be derived from poultry manure.

Other objects and advantages of the invention will become readily apparent from the ensuing description.

DETAILED DESCRIPTION OF THE INVENTION

The present invention involves the creation of activated carbons from poultry manure that possess enhanced adsorption ability for metal ions. The carbon source for the activated carbons of the present invention may be poultry manure from any one or a combination of chickens, turkeys, ducks, geese or quail, with manure from chickens and turkeys being preferred. While not wishing to be held thereto, it is believed that carbonization or pyrolysis of the manure, followed by activation, entraps pre-existing phosphorous found in the manure, primarily in the form of phosphate ions within the activated carbon matrix, thus improving the carbon's metal ion adsorption properties. We have found that the activated carbons produced from poultry manure in accordance with this invention possess a phosphorous content of greater than or equal to about 4.0%, by weight.

Poultry manure for use herein may be obtained from a variety of sources. Although the manure may be collected as droppings substantially free from other contaminating materials, as a practical matter it is envisioned that the manure will be poultry cake or litter. In this preferred embodiment, the poultry manure is typically supplied by a concentrated poultry facility operator after the floor of the facility has been cleaned by the operator. Normally, a partial cleaning yields what is known in the art as cake, and a more thorough cleaning of the facility yields litter. As used herein, cake is defined as material from a concentrated poultry facility that consists of bird droppings, feathers, and small amounts (<5%) of bedding material. Without being limited thereto, the bedding material is usually wood shavings, typically soft wood, such as pine. In terms of weight percentages it is typically about 80 or more percent droppings, 10 or more percent feathers, and 1-4 percent bedding material. Litter is defined as material from a concentrated animal facility that consists of bird droppings, feathers, and larger amounts of bedding material. In terms of weight percentages litter is typically about 60-70 percent droppings, about 10 percent feathers, and about 20-30 percent bedding material.

Although poultry manure may be subjected to carbonization directly, in the preferred embodiment the manure is first ground or milled, and pelletized. As noted above, cake or litter obtained from a poultry rearing facility are heterogeneous mixtures comprising a wide range of particle sizes. The manure is therefore preferably ground to a mixture of substantially uniform particle size, typically a powder. The degree of grinding may be varied, but is preferably to about 20 mesh (approximately 1 mm) or smaller particle size. The ground, powdered manure is then subjected to an optional, yet preferred pelletization. While activated carbons may be produced from powdered manure, the resultant products are not suitable for use in columns due to the reduced void spaces in a powder filled column and resultant poor fluid flow characteristics.

Fresh poultry manure typically has a high moisture content making milling or grinding difficult. Thus, in the preferred embodiment the manure is first dried to a moisture content more suitable for grinding, preferably less than about 10% by weight. While this low moisture content facilitates grinding, higher moisture contents are desirable for pelletization (manure at low moisture levels does not pelletize well and pellets so produced are readily friable). Therefore, following grinding, the resultant powdered manure is rehydrated to a moisture content suitable for producing hard, durable pellets from a pellet mill. In the preferred embodiment, the ground manure is rehydrated to a moisture content between about 15 to about 30%. It is also envisioned that optional binders may be added to the manure to further facilitate pelletization, although adsorptive efficacy may be consequently reduced. Addition of binders to the manure may allow pelletization at lower moisture contents than otherwise necessary and may enhance durability. A variety of binders are known in the art and are suitable for use herein, including coal tar or wood tar, and natural product binders such as starches or molasses. Pelletization may be effected using equipment and techniques conventional in the art, and the size of the pellets is not critical and may vary. However, for optimal activation as described hereinbelow, the preferred pellet size is between approximately 3/16 inch and 3/8 inch in diameter (for cylindrical pellets the length may also vary between approximately 3/16 to 3/8 inches).

Carbonization or pyrolysis is effected by heating the ground and pelletized manure for a period of time and under conditions effective to carbonize the poultry manure. In the preferred embodiment, the poultry manure is heated to a temperature range of about 700° C. to 800° C. under an inert, substantially oxygen-free atmosphere (e.g., nitrogen or other gas) for a time ranging from about 30 min to about 90 min, most preferably for about 50 to about 70 min.

Following pyrolysis, the carbonized manure is contacted with steam under conditions of time, flow rate, and temperature sufficient to effect activation substantially throughout the matrix of the manure particles. In accordance with this invention, these conditions for activation are selected which are effective to generate activated carbon having a BET surface area of greater than or equal to 200 m²/g (of carbon), preferably greater than 300 m²/g. The reaction is largely governed by transport phenomena involving diffusive processes, and the particle size of the carbonized manure affects the rate and degree of achievable activation. In the preferred embodiment, the manure is activated by heating with steam at a temperature of about 700 to about 900° C., most preferably from about 750 to about 850° C., for about 15 to about 75 min, preferably for about 30 to about 45 min. For activation in a sealed retort, steam is produced by allowing water to flow into a gaseous inert carrier stream fed into the retort chamber containing the carbonized manure. The steam flow rate, expressed as the amount of water added to the gaseous carrier fed into the retort per unit weight of carbonized manure, is somewhat variable. Suitable steam flow rates may vary between about 0.1 to about 5.0 ml/kg·min, with flow rates between about 1 to about 5.0 ml/kg·min being preferred, and flow rates between about 2 to about 4 ml/kg·min. being particularly preferred. Using the conditions described hereinabove, we have produced activated carbons having a BET surface area greater than 200 m²/g, even above 450 m²/g. Although higher flow rates could be used, such rates may lead to greater burnoff, significantly increasing the pore size within the particle matrix, reducing the active surface area of the product and thus reducing efficacy (adsorption) during use. Use of flow rates significantly below 0.1 mg/kg·min may also lead to decreased efficacy of the activated carbon, albeit due to decreased activation. In an alternative, although not preferred embodiment, it is also envisioned that activation may be effected using $CO_2$ or other activation gas rather than steam. At the conclusion of activation the activated carbons should be allowed to cool, preferably to ambient temperature, before exposure to air.

Activation is typically conducted in an evaporating dish or other vessel that can withstand temperatures up to 1200° C. In the preferred embodiment, the carbonized manure pellets are placed in the dish such that the depth of the pellets does not exceed about one to one and one-half inches. A larger depth will result in a mixture of activated carbons with different degrees of activation.

Prior to utilization, the activated carbons are preferably washed to remove ash remaining in the pores of the particle matrix. Although washing in this manner is optional, the efficacy of the activated carbons may be reduced if such washing is omitted. The activated carbons may be washed with a mineral acid, with 0.1 M HCl being the preferred acid and the preferred concentration. After acid treatment, the carbons are rinsed with water one or more times, preferably two to four times, to remove excess acid and produce a carbon with a pH close to neutrality (i.e., a pH between 6.0-8.0). The carbons are then dried at a temperature sufficient to reduce the moisture content of the carbons to below approximately 5% by weight prior to use. The manner of drying is not critical, although drying at 80° C. for at least 6 hr is generally preferred.

While not wishing to be bound thereto, it is theorized that the pyrolysis conditions create planar sheets of hydrocarbon molecules that stack upon each other and are held together by weak atomic forces called London dispersion forces. The planar sheets create a lattice structure for the pyrolyzed manure that develop the carbon structure including the internal and external pore structures. The hydrocarbon lattice is irregular in overall shape and repeatedly interrupted by the presence of pores or voids in the structure. During pyrolysis, inorganic constituents, such as phosphorus as phosphate, contained in the manure as part of its overall composition are either physically "trapped" or covalently (chemically) bound within the lattice structure and are generally difficult to remove through subsequent acid and/or water washing of the carbon. During steam activation, the energized water molecules react with the loose organic material contained in the pore structure of the carbon and effectively remove them from the pore, thereby increasing the volume of the pore and the area of exposed pore surface, thus increasing the surface area of the manure-based carbon and perhaps exposing more phosphate ions at the surface. In general, the longer the carbon is exposed to steam activation, the greater the surface area.

It is further theorized that the presence of "trapped" or covalently bound phosphorus, which is primarily in the form of phosphate ion, can create centers of negative charge on the carbon at most pH values. Moreover, the centers of negative charge can readily adsorb or ionically bind positively charged ions such as metal ions, particularly those common metal cations such as those selected from the group consisting of Cu(II), Pb(II), Zn(II), Cd(II), Ni(II), Cr(III), Hg(II), Fe(II), Fe(III), Al(III), Co(II), Sn(II), Sn(IV), Ca(II) and Mg(II).

The activated carbons of the invention may be utilized as an adsorbent in any application known in the art for which normal activated carbon is used. Moreover, these novel activated carbons are particularly suited for the adsorption and/or recovery of any of the above-mentioned heavy metals from contaminated fluids. In order to adsorb these metals or other contaminants, the fluid to be treated may be contacted with the activated carbons by conventional methods, such as but not limited to, a fixed bed, a moving bed, a fluid bed, a slurry-type or a batch-type contact stirring method. The optimal contact period may be vary with the concentration of the contaminants, the particle size of the activated carbon, and the contact method, and may be readily determined by the user.

The following examples are intended to further illustrate the invention and are not intended to limit the scope of the invention which is defined by the claims.

EXAMPLE 1

In this and the following examples, all percentages are by weight unless otherwise specified.

Broiler cake and litter were obtained from the USDA-ARS, Poultry Research Unit, Starkville, Miss., and turkey cake and litter were obtained from Boeckmann Farms, California, MO. These materials were dried to a moisture content of less than 10% and milled in a Retsch cross-beater mill (Glen Mills, Clifton, N.J.) to a particle size of less than US 20 mesh (<1 mm). At this stage, samples of all four manures were sent to an outside laboratory (Central Analytical Laboratories, Belle Chase, La.) for elemental analysis of total carbon, nitrogen, phosphorous, potassium and sulfur. Ash and moisture were also determined.

The remainder of the broiler cake and litter and turkey cake and litter were pelletized in a PMCL5 Lab pellet mill (California Pellet Mill, Merrimack, N.H.) equipped with a 3/16 in die plate. The manure was brought to a moisture level of 20 to 35% by mixing the dried manure with water in a ribbon blender. Moisture content was monitored by using a Sartorius Moisture Analyzer model MA 51 (Sartorius, Brentwood, N.J.). The pellets produced were cylinders of 3/16 in diameter and 3/16 in length.

Pelletized poultry cake and litter were placed in a ceramic evaporating dish and placed in a Lindberg bench furnace equipped with a retort (Lindberg/Blue M, Waterton, Wis.). Pellets were pyrolyzed at 700° C. for one hour under a flow of nitrogen gas set at a flow rate of 0.1 $m^3$/hr. Steam activation involved injecting water at a flow rate of 3 ml/min, using a peristaltic pump, into a flow of nitrogen gas entering the heated retort. Pyrolyzed chars were activated at 800° C. for 45 min. Activated carbons were allowed to cool to room temperature overnight in the retort. Samples were washed with 0.1 M HCl and subsequently given three separate water washings before being dried overnight at 80° C.

A sample of the dried carbons were sent to an outside laboratory for elemental analysis of total carbon, nitrogen, phosphorous, potassium and sulfur. Ash and moisture were also determined. Ash content (%) was determined by an outside laboratory (Central Analytical Laboratories, Belle Chase, La.). The results are given in Table 1.

TABLE 1

Elemental analysis, ash and moisture content of broiler and turkey cake and litter and their respective activated carbons on a % basis

| Sample | Total carbon (C) | Nitrogen (N) | Phosphorus (P) | Potassium (K) | Sulfur (S) | Ash | Moisture content |
|---|---|---|---|---|---|---|---|
| Broiler cake | 32.6 | 3.6 | 1.9 | 3.8 | 0.8 | 20.6 | 5.7 |
| Broiler cake carbon | 17.2 | 0.6 | 5.3 | 5.8 | 0.8 | 74.4 | 0.8 |
| Broiler litter | 34.4 | 3.3 | 1.7 | 3.8 | 0.7 | 20.3 | 3.5 |
| Broiler litter carbon | 25.8 | 0.8 | 4.8 | 3.0 | 0.6 | 64.9 | 0.9 |
| Turkey cake | 35.4 | 4.8 | 1.9 | 2.9 | 0.7 | 16.4 | 9.5 |
| Turkey cake carbon | 30.5 | 1.4 | 7.3 | 4.6 | 1.5 | 60.8 | 2.3 |
| Turkey litter | 34.9 | 3.8 | 2.3 | 2.8 | 0.6 | 16.8 | 8.6 |
| Turkey litter carbon | 32.6 | 1.1 | 7.9 | 4.1 | 0.9 | 59.5 | 2.2 |

The elements carbon, nitrogen and sulfur can be volatilized during pyrolysis and activation of the manure. Their percent changes between the cake and litter and their respective carbons reflect any volatilization that may have occurred. The elements phosphorus and potassium are not volatile and an increase in their concentration reflects volatilization of the other major elements in the manure. The increase in ash content of the carbons is a reflection of the presence of other, non-volatile elements, mostly metal ions and their respective anions. The high ash content of the carbons also signifies the presence of inorganic constituents (phosphorus, potassium, etc.) that are difficult to remove by mineral acid and water washes.

EXAMPLE 2

Poultry cake and litter along with samples of coal, coconut shell and hardwood were subjected to the same milling, pelletization and activated carbon production protocol given in Example 1. The resulting carbons were evaluated for select physical and chemical properties that include carbon yield, surface area, apparent (bulk) density, attrition (hardness) and ash content. In addition to the carbons listed above, two commercial carbons, designated Minotaur and PŪR RF, were also evaluated for the select properties, except for carbon yield, as this information was not available. Minotaur is a coal-based carbon product of the Calgon Carbon Corp. (Pittsburgh, Pa.) and was developed to adsorb heavy metals, such as lead, from drinking water. PŪF (PŪR Replacement Filter) is also a coal-based product found in PŪR brand drinking water filtration systems (Recovery Engineering Corp., Minneapolis, Minn.) that claim removal of lead, organics, chlorine and microorganisms from drinking water.

Carbon yield was calculated by the following equation:

$$\text{Carbon yield}(\%) = [(Wt_c \div Wt_m) \times 100]$$

where $Wt_m$=dry weight in g of the manure and $Wt_c$=dry weight in g of the carbon.

Surface area measurements were obtained from nitrogen adsorption isotherms at 77° K using a Nova 2000 Surface Area Analyzer (Quantachrome Corp., Boynton Beach, Fla.). Specific surface areas ($S_{BET}$) were taken from adsorption isotherms using the Brunauer, Emmett, and Teller (BET) equation.

Apparent (bulk) density was determined by the following relationship:

$$\text{Bulk density}(g/cm^3) = Wt_c \div V_c$$

where $Wt_c$=the dry weight in g of the carbon of a particular particle size (18×40 US mesh) and $V_c$=the volume occupied by the carbon of particular particle size (18×40 US mesh).

Attrition was determined by the following method: 3 g of 18-40 mesh granular carbon are placed in a 250 ml Erlenmeyer flask. Ten glass marbles of about 5 g each are also added to the flask, which is then continuously agitated at 200 rpm in an Aquaterm water bath shaker for 15 minutes at 25° C. The carbon retained by a 40 mesh sieve is weighed and the attrition number calculated as: (wt of carbon retained/initial sample wt.)×100.

TABLE 2

Select physical and chemical properties of poultry manure-based activated carbons, carbons made from traditional sources and two commercial activated carbons

| Sample | Yield (%) | Surface area (m2/g) | Bulk density (g/cm3) | Attrition (%) |
|---|---|---|---|---|
| Broiler cake | 28.7 | 395 | 0.62 | 24.0 |
| Broiler litter | 30.8 | 441 | 0.54 | 17.9 |
| Turkey cake | 28.7 | 441 | 0.58 | 25.8 |
| Turkey litter | 29.9 | 419 | 0.59 | 20.0 |
| Coal | 78.5 | 6 | 0.48 | 18.5 |
| Coconut shell | 23.09 | 832 | 0.54 | 13.8 |
| Hardwood | 18.3 | 906 | 0.30 | 15.6 |
| Minotaur | N/A | 839 | 0.49 | 38.3 |
| PŪR RF | N/A | 474 | 0.42 | 32.1 |

N/A = not available

Poultry manure-based activated carbons are dense but brittle carbons compared to the carbons made from traditional materials, such as coal, coconut shells and hardwood, and the commercial carbons. They also have lower surface area than carbons made from two of the three traditional materials and the commercial carbons. The very low surface area shown by the coal-based carbon is due to the low activation temperature (800° C.) and short steam activation time (45 min) used to activate a hard, dense material such as coal. All of the above properties depend on the physical and chemical characteristics of the source material, namely cake and litter versus coal, coconut shells and hardwood.

EXAMPLE 3

Poultry cake and litter along with samples of coal, coconut shell and hardwood were subjected to the same milling, pelletization and pyrolysis protocol given in Example 1. However, poultry manures and the traditional sources of carbon were steam activated by injecting water at a flow rate of 3 ml/min, using a peristaltic pump, into a flow of nitrogen gas entering the heated retort. Pyrolyzed chars were activated at 800° C. for 30 min in the steam environment. Activated carbons were allowed to cool to room temperature overnight in the retort. Samples were washed with 0.1 M HCl and subsequently given three separate water washings before being dried overnight at 80° C.

The carbons were evaluated for surface charge at pH 5.0. One g of activated carbon was suspended in distilled water. Sample pH was adjusted to 5.0 by adding several drops of 0.1 N NaOH. After adjustment, samples were rinsed on a US 50 mesh screen and dried overnight at 80° C. One-quarter gram of carbon was suspended in 25 ml of 0.1000 N NaOH and stirred in a closed vessel for 24 hr. The suspension was filtered and a 10 ml aliquot was added to 15 ml of 0.1000 N HCl. The solution was back-titrated 0.1000 N NaOH using Bromthymol Blue as a indicator. The volume of NaOH required to neutralize the sample was converted to titratable negative surface charge with results expressed as mmol $H^+$ equivalent/g carbon by using the following equation:

$$\text{Surface charge (mmol } H^+ \text{ equivalent/g)} = [(V_{sample} - V_{blank}) \cdot x(V_s/V_f)x\ N_{HCl}] \div Wt_c$$

where $(V_{sample} - V_{blank})$=ml of NaOH used to titrate sample minus ml of NaOH used to titrate blank, $(V_s/V_f)$ equals ml of NaOH in original suspension divided by ml of NaOH used in the back-titration, $N_{HCl}$ equals the normality of HCl and $Wt_c$ equals weight of carbon in grams.

The carbons were analyzed for metal ion uptake using 20 mM solutions of cadmium chloride ($CdCl_2$), copper chloride ($CuCl_2$), nickel nitrate [$Ni(NO_3)_2$] or zinc chloride ($ZnCl_2$), which were made up in an 0.07 M sodium acetate-0.03 M acetic acid buffer (pH 4.8). One-quarter gram of carbon (18× 40 US mesh) was stirred for 24 hr in 25 ml of the metal ion solution. The pH of the carbon suspension was recorded at the start and at the end of the experiment. Variations in pH between the start and end of the experiments were 4.8±0.5 pH units. An aliquot of the suspension was drawn off in a disposable syringe, then filtered through a 0.22 μm Millipore filter (Millipore Corp., Bedford, Mass.) to remove any carbon particles. The sample was diluted 1:100 by volume with 4 vol % nitric acid ($HNO_3$, Ultrapure, ICP grade) and analyzed by inductively coupled plasma (ICP) spectrometry using a Leeman Labs Profile ICP-AES (Leeman Labs, Hudson, N.H.).

TABLE 3

Surface charge and metal ion adsorption of poultry manure-based activated carbons, carbons made from traditional sources and two commercial activated carbons

| Sample | Surface charge (mmol $H^+$eq/g) | Metal ion adsorption (mmol/g carbon) | | | |
|---|---|---|---|---|---|
| | | $Cd^{2+}$ | $Cu^{2+}$ | $Ni^{2+}$ | $Zn^{2+}$ |
| Broiler cake | 1.04 | 1.33 | 1.90 | 0.42 | 1.94 |
| Broiler litter | 0.32 | 1.09 | 1.20 | 0.06 | 1.33 |
| Turkey cake | 0.54 | 1.58 | 1.60 | 1.30 | 1.85 |
| Turkey litter | 0.98 | 1.50 | 1.86 | 0.82 | 1.72 |
| Coal | N/A | 0.03 | 0.08 | 0.56 | 0.04 |
| Coconut shell | 0.30 | 0.04 | 0.29 | 0.02 | 0.06 |
| Hardwood | 0.74 | 0.02 | 0.26 | 0.00 | 0.14 |
| Minotaur | 2.62 | 0.71 | 0.93 | 0.62 | 0.69 |
| PUR RF | 0.10 | 0.15 | 0.28 | 0.00 | 0.15 |

N/A = not available

Poultry manure-based activated carbons generally showed excellent metal ion adsorption properties at pH 4.8. These carbons, in general, adsorbed significantly more metal ion than carbons made from traditional sources when all carbons were made under the same pyrolysis and activation conditions. These results indicate that it is the source material (animal manure) and not pyrolysis and activation conditions which determine a carbons ability to adsorb metal ions. In this regard, manure may have inorganic components, such as phosphorus as phosphate, present in higher concentrations than found in coal, coconut shells or wood that impart excellent metal ion adsorption properties on the resultant carbons. Poultry manure-based activated carbons generally showed better metal ion adsorption properties than the two commercial carbons, especially Minotaur, a carbon developed for its superior metal ion adsorption properties compared to other commercial carbons.

It is understood that the foregoing detailed description is given merely by way of illustration and that modifications and variations may be made therein without departing from the spirit and scope of the invention.

We claim:

1. A method for producing activated carbon from poultry manure comprising:
    a) grinding poultry manure prior to said carbonizing to provide a mixture of substantially uniform sized particles;
    b) carbonizing said poultry manure which has been ground to produce carbonized manure, and
    c) activating said carbonized manure under conditions effective to produce activated carbon having a BET surface area greater than 200 $m^2$/g.

2. The method of claim 1 wherein said poultry manure is selected from the group consisting of poultry cake and poultry litter.

3. The method of claim 1 wherein said poultry manure is ground to about 20 mesh.

4. The method of claim 1 further comprising pelletizing said mixture of substantially uniform sized particles to provide pelleted manure.

5. The method of claim 4 wherein said pelleted manure is between approximately 3/16 inch and approximately 3/8 inch in diameter.

6. The method of claim 1 wherein said carbonizing comprises heating said poultry manure for a period of time and under conditions effective to carbonize said manure.

7. The method of claim 1 wherein said poultry manure is carbonized in a substantially oxygen-free environment.

8. The method of claim 1 wherein said activating comprises contacting said carbonized manure with steam.

9. The method of claim 8 wherein said activating comprises contacting said carbonized manure with steam at a flow rate of between about 0.1 to about 5.0 ml/kg·min, at a temperature between about 700 to about 900° C., for about 15 to about 75 minutes.

10. The method of claim 9 wherein said stream flow rate is between about 1.0 to about 5.0 ml/kg·min.

11. The method of claim 1 further comprising washing said activated carbon with mineral acid to remove ash therefrom, and rinsing the washed activated carbon with water.

12. The method of claim 1 wherein said conditions for activating said carbonized manure are effective to produce activated carbon having a BET surface area greater than about 300 $m^2$/g.

13. The method of claim 1 wherein said activated carbon further comprises a phosphate ion content greater than 4.0% by weight.

* * * * *